(12) United States Patent
Hariom et al.

(10) Patent No.: US 12,107,818 B2
(45) Date of Patent: Oct. 1, 2024

(54) ISP SPECIFIC SMART IP SELECTION FOR EMAIL

(71) Applicant: ADOBE INC., San Jose, CA (US)

(72) Inventors: Hariom, Bihar (IN); Deepansh Rawal, Noida (IN); Shivam Goel, Meerut (IN); Gaurav Panwar, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/653,544

(22) Filed: Mar. 4, 2022

(65) Prior Publication Data

US 2023/0283584 A1  Sep. 7, 2023

(51) Int. Cl.
*H04L 51/48* (2022.01)
*G06N 20/00* (2019.01)
*H04L 51/224* (2022.01)
*H04L 51/23* (2022.01)

(52) U.S. Cl.
CPC ............ *H04L 51/48* (2022.05); *H04L 51/224* (2022.05); *H04L 51/23* (2022.05); *G06N 20/00* (2019.01)

(58) Field of Classification Search
None
See application file for complete search history.

(56) References Cited

U.S. PATENT DOCUMENTS

| | | | | |
|---|---|---|---|---|
| 8,560,616 | B1* | 10/2013 | Diac | H04L 51/212 709/229 |
| 2014/0280624 | A1* | 9/2014 | Dillingham | H04L 12/1859 709/206 |
| 2019/0387005 | A1* | 12/2019 | Zawoad | H04L 63/1408 |
| 2021/0184999 | A1* | 6/2021 | Klink | H04L 51/216 |
| 2022/0230142 | A1* | 7/2022 | Batchu | H04L 63/1425 |

* cited by examiner

*Primary Examiner* — Ario Etienne
*Assistant Examiner* — Mohammad Yousuf A. Mian
(74) *Attorney, Agent, or Firm* — F. CHAU & ASSOCIATES, LLC

(57) ABSTRACT

Systems and methods for email processing are described. Embodiments of the present disclosure identify a plurality of email recipients, wherein each of the plurality of email recipients has an email address associated with one of a plurality of internet service providers (ISPs); identify a plurality of internet protocol (IP) addresses, wherein each of the plurality of IP addresses is available for sending email from a user to the plurality of email recipients; compute an ISP-IP score for each of a plurality of ISP-IP pairs based on email delivery statistics; select an IP address from the plurality of IP addresses corresponding to each of the plurality of email recipients based on the ISP-IP score; and transmit an email to each of the plurality of email recipients from the selected IP address.

18 Claims, 8 Drawing Sheets

ISP SPECIFIC SMART IP SELECTION FOR EMAIL

BACKGROUND

The following relates generally to email processing, and more specifically to dynamic IP selection.

Data analysis, or analytics, is the process of inspecting, cleaning, transforming, and modeling data. In some cases, data analytics systems may be adapted to business decision-making, information collection, and resource allocation. Data analysis includes a number of subfields including data mining and business intelligence. Email processing is an area of data analytics. Marketers rely on emails to inform customers of company news, offers, product updates, etc. In some cases, email delivery efficiency depends on the reputation of internet protocol (IP) address in relation to a particular internet service provider (ISP).

However, conventional email processing systems often encounter unsuccessful email delivery if an IP address has low reputation or is blocked by an ISP, and hence emails are not delivered to target recipients or they are categorized as spam emails by the ISP. This leads to a decrease in IP address reputation and low satisfaction for marketers. Therefore, there is a need in the art for an improved email processing system that can automatically select suitable IP addresses to transmit emails and increase email delivery success.

SUMMARY

The present disclosure describes systems and methods for email processing. Embodiments of the present disclosure include an email processing apparatus comprising a scoring component and a selection component. The email processing apparatus identifies a set of email recipients for a user (e.g., a marketer) and a set of IP addresses for the user. Each of the set of email recipients has an email address associated with an ISP (e.g., an email address having suffix "@gmail.com" is associated with Google® ISP). The scoring component of the email processing apparatus computes an ISP-IP score for each of a set of ISP-IP pairs. In some examples, each of the set of ISP-IP pairs comprises a paired ISP from the set of ISPs and a paired IP address from the set of IP addresses. Additionally, the scoring component computes a relative ISP-IP score for the paired IP address based on ISP-IP scores for each of the set of IP addresses associated with the paired ISP. The selection component selects an IP address from the set of IP addresses corresponding to each of the set of email recipients based on the relative ISP-IP score with respect to the set of IP addresses.

A method, apparatus, and non-transitory computer readable medium for dynamic internet protocol (IP) selection are described. One or more embodiments of the method, apparatus, and non-transitory computer readable medium include identifying, by an email processing apparatus, a plurality of email recipients, wherein each of the plurality of email recipients has an email address associated with one of a plurality of internet service providers (ISPs); identifying, by the email processing apparatus, a plurality of IP addresses, wherein each of the plurality of IP addresses is available for sending email from a user to the plurality of email recipients; computing, by a scoring component of the email processing apparatus, an ISP-IP score for each of a plurality of ISP-IP pairs based on email delivery statistics, wherein each of the plurality of ISP-IP pairs comprises an ISP from the plurality of ISPs and an IP address from the plurality of IP addresses; selecting, by a selection component of the email processing apparatus, an IP address from the plurality of IP addresses corresponding to each of the plurality of email recipients based on the ISP-IP score; and transmitting, by the email processing apparatus, an email to each of the plurality of email recipients from the selected IP address.

An apparatus and method for dynamic IP selection are described. One or more embodiments of the apparatus and method include a data collection component configured to collect email delivery statistics for a plurality of internet service providers (ISPs) and a plurality of internet protocol (IP) addresses, wherein the email delivery statistics include a first number of emails sent from each of the plurality of IP addresses to each of the plurality of ISPs and a second number of emails delivered successfully from each of the plurality of IP addresses to each of the plurality of ISPs; a scoring component configured to compute an ISP-IP score for each of a plurality of ISP-IP pairs by calculating a ratio between the second number and the first number, wherein each of the plurality of ISP-IP pairs comprises an ISP from the plurality of ISPs and an IP address from the plurality of IP addresses; and a selection component configured to select an IP address from the plurality of IP addresses corresponding to each of a plurality of email recipients based on the ISP-IP score.

A method, apparatus, and non-transitory computer readable medium for dynamic IP selection are described. One or more embodiments of the method, apparatus, and non-transitory computer readable medium include collecting, by a data collection component of an email processing apparatus, email delivery statistics for a plurality of internet service providers (ISPs) and a plurality of internet protocol (IP) addresses; computing, by a scoring component of the email processing apparatus, an ISP-IP score for each of a plurality of ISP-IP pairs based on the email delivery statistics, wherein each of the plurality of ISP-IP pairs comprises an ISP from the plurality of ISPs and an IP address from the plurality of IP addresses; selecting, by a selection component of the email processing apparatus, an IP address from the plurality of IP addresses corresponding to each of a plurality of email recipients based on the ISP-IP score; and transmitting, by the email processing apparatus, an email to each of the plurality of email recipients from the selected IP address.

DETAILED DESCRIPTION

Figure 1:
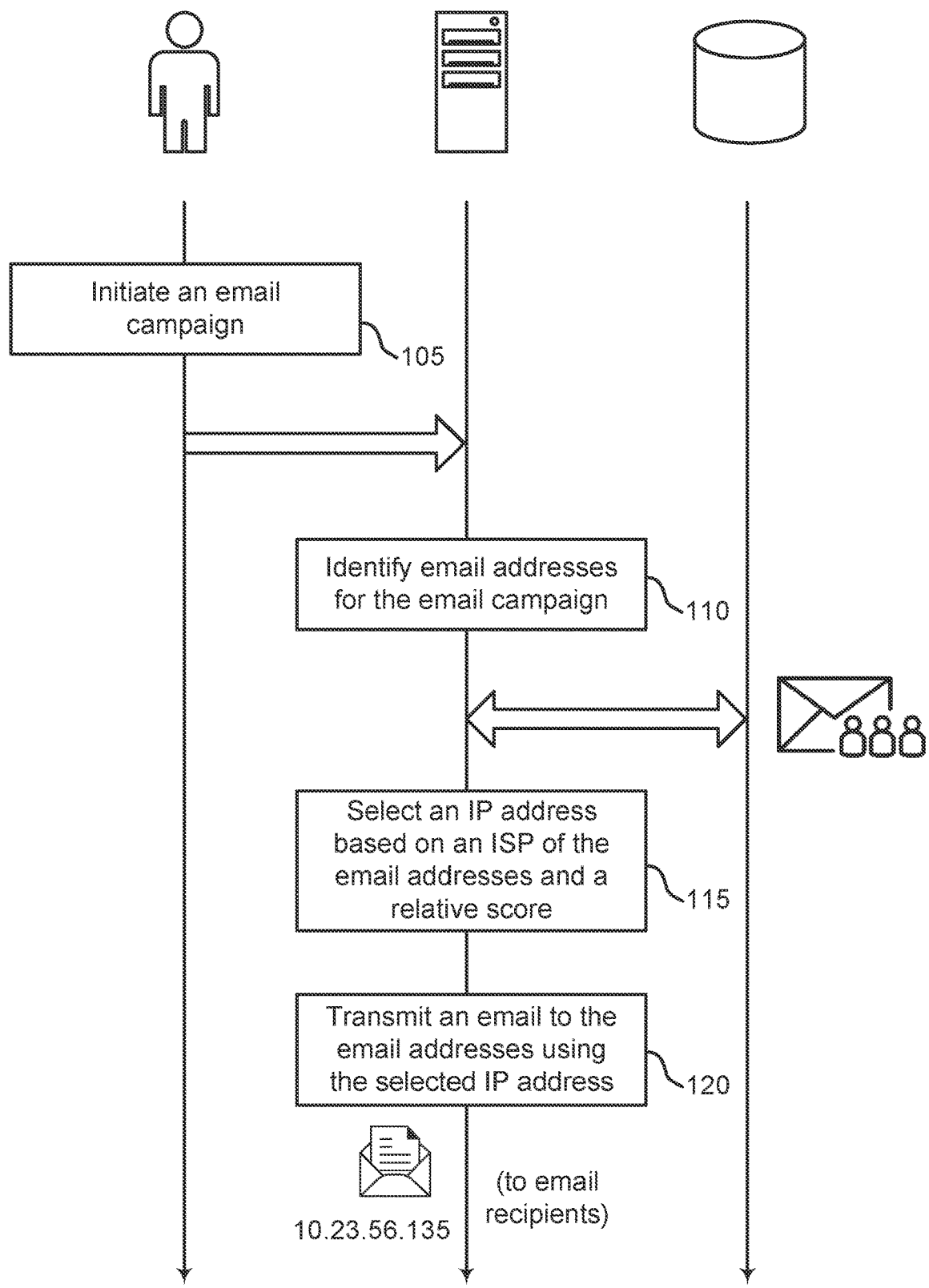
FIG. 1 shows an example of email processing according to aspects of the present disclosure.

Recently, marketers of companies rely on email processing systems to collect and analyze email recipients' data and execute email campaigns to promote products to the email recipients. Conventional email processing systems divide email traffic equally among allocated IPs using scheduling algorithms such as round-robin, random-selection algorithms to ensure load balancing. However, conventional algorithms fail to take into consideration situations where certain IPs may be blocked by an ISP or have a relatively low reputation metric. Accordingly, these email processing systems have low inbox delivery rates and emails that are sent may be rejected or categorized as spam emails by the ISP.

In some cases, conventional email processing systems reduce inbox delivery rates based on feedback from an ISP (e.g., throttle the number of connections and/or suspend email delivery in response to delivery issues). That is, conventional systems can only handle rejections after detecting irregular email delivery but are not able to reduce rejections from ISPs.

The present disclosure describes systems and methods for email processing. Embodiments of the present disclosure include an email processing apparatus configured to select a suitable IP address from which a user (e.g., email campaign marketer) sends emails to recipients. The email processing apparatus identifies a set of email recipients for a user (e.g., a marketer) and a set of IP addresses for the user. Each email recipient has an email address associated with an ISP (e.g., an email address having suffix "@gmail.com" is associated with Google® ISP). An ISP and an IP address form an ISP-IP pair. The email processing apparatus computes an ISP-IP score for each of a set of ISP-IP pairs. In some examples, each of the set of ISP-IP pairs comprises a paired ISP from the set of ISPs and a paired IP address from the set of IP addresses. Additionally, the email processing apparatus selects an IP address from the set of IP addresses corresponding to each of the set of email recipients based on the ISP-IP score. The email processing apparatus intelligently selects a suitable IP address to send emails to the given ISP. Accordingly, email delivery success rate for email campaigns is increased.

In some embodiments, the email processing apparatus receives historical data regarding recipient interaction associated with the paired IP address and the paired ISP. The ISP-IP score is computed based on the historical data. The ISP-IP score indicates email delivery success when sending emails from the paired IP address to the paired ISP. Such an ISP-IP score is calculated for each of the ISP-IP pairs based on respective historical performance. In some examples, the scoring component also computes a relative ISP-IP score for the paired IP address based on ISP-IP scores for each of the set of IP addresses associated with the paired ISP. The relative ISP-IP score is calculated with respect to the set of IP addresses. Given an ISP from a list of email recipients, the email processing apparatus selects a suitable IP address from the set of IP address based on the relative ISP-IP score. The user then sends campaign emails from the selected IP address to the given ISP to increase email delivery success rate.

Embodiments of the present disclosure include an email processing apparatus and methods using intelligent IP selection based on computing an ISP-IP score for each of a set of ISP-IP pairs. The email processing apparatus identifies a set of email recipients for a user (e.g., a marketer). Each of the email recipients has an email address associated with one of a set of ISPs (e.g., an email address having a suffix "@gmail.com" is associate with Gmail® ISP). The user is allocated with multiple IP addresses. A scoring component of the email processing apparatus computes an ISP-IP score for each of a set of ISP-IP pairs. Each of the set of ISP-IP pairs comprises a paired ISP from the set of ISPs and a paired IP address from the set of IP addresses.

In some examples, the scoring component computes the ISP-IP score based on historical data regarding recipient interaction associated with the paired IP address and the paired ISP. A selection component of the email processing apparatus selects an IP address from the set of IP addresses corresponding to each of the set of email recipients based on the ISP-IP score. That is, a score is calculated for each IP address allocated to the user with regard to an ISP from the set of ISPs.

According to some embodiments, ISP-IP scores are cached in mail transfer agents (MTAs). The mail transfer agent includes a dynamic IP selection module that selects a suitable IP address for each ISP using a weighted sampling algorithm. The mail transfer agent selects a suitable IP address with regard to an ISP such as Gmail®, Yahoo®, and the like. The email processing apparatus transmits an email to each of the set of email recipients from the corresponding IP address.

By selecting a suitable IP address based on ISP-IP score, embodiments of the present disclosure provide high inbox delivery rates and reduce rejections from ISPs. In some embodiments, the email processing apparatus and intelligent IP selection methods identify compromised IP addresses before email delivery. At least one embodiment of the email processing apparatus computes an ISP-IP score for each of a set of ISP-IP pairs based on recipients' email addresses and allocated IP addresses for a user (e.g., a marketer). Then a relative ISP-IP score is computed for the paired IP address based on ISP-IP scores for each of a set of IP addresses associated with the paired ISP. The effective email delivery rate depends on the relative ISP-IP score. Selecting the IP address corresponding to a higher relative ISP-IP score yields a higher effective email delivery rate. For example, assume a marketer is allocated with two IP addresses given an ISP (e.g., Yahoo.com®). The email processing apparatus computes an ISP-IP score for each of the two IP addresses and then computes a relative ISP-IP score for each of the two IP addresses based on the ISP-IP scores. The email processing apparatus increases email delivery success rate for email campaigns by intelligently selecting a suitable IP address to send emails to the given ISP and accordingly, the customer's satisfaction rate is increased. A less suitable IP address (e.g., low IP reputation in relation to an ISP) would not be selected or would be used less often to send emails to the ISP. The less suitable IP address does not suffer from a further decrease in IP reputation. Thus, less resources are spent on restoring reputation for IP addresses.

An "electronic mail" (email or e-mail) is a method of exchanging messages ("mail") between people using electronic devices. An "email address" is an email ID combined with the domain name of the email registrar (e.g., email hosting services or email hosting servers such as Gmail®, Yahoo®). In the context of the present specification, the domain name indicates an internet service provider (ISP). The domain name or ISP is often identified after "at" sign in an email address. For example, email address "joe@gmail.com" includes an email ID "joe" and domain name "gmail.com" (i.e., ISP is Gmail®).

An "IP address" or a reputation metric associated with an IP address determines email delivery success in email campaigns. Each user or marketer is allocated with a set of IP addresses, and emails are sent from the IP addresses using a network scheduling algorithm (e.g., a round-robin scheduling algorithm). In some cases, internet service providers (ISPs) track the frequency, content, recipient lists, and engagement of email campaigns to monitor suspicious activities for the IPs on the Internet. For example, when an IP address crosses a threshold value (e.g., pre-determined threshold), the associated sender reputation would be negatively affected. In some examples, certain emails land in spam folders and can eventually result in blocklisting of IP addresses.

An "ISP-IP score" measures email delivery success from an IP address to an ISP. The ISP-IP score may also be referred to as ISP specific IP score and can be measured as a ratio between total emails delivered successfully by an ISP and total emails sent to the ISP. In some examples, the scoring component of the email processing apparatus identifies a first number of emails sent from the paired IP address to the paired ISP; identifies a second number of emails delivered successfully to the paired ISP from the paired IP address; and computes a ratio between the second number and the first number. The ISP-IP score is based on the ratio.

"Email delivery statistics" include data with regards to email transmission from a user (e.g., a marketer of a company) to a set of target email recipients. Each email recipient has an email address associated with one of a set of ISPs. Email delivery statistics include data with regards to a number of emails sent from an IP address to an ISP and a number of emails delivered successfully to the ISP from the IP address. In some cases, email delivery statistics includes data indicating that an email recipient receives an email sent from the user, opens the email, and interacts with the email.

Embodiments of the present disclosure may be used in the context of email processing applications. For example, an email processing system based on the present disclosure may identify a set of email recipients and a set of IP addresses for a user and transmits an email to each of the set of email recipients from an IP address that is intelligently selected based on a relative ISP-IP score of the IP address with respect to a set of IP addresses. An example application of the inventive concept in the email processing context is provided with reference to FIG. 1. Example processes for email processing are provided with reference to FIGS. 2-4. Details regarding the architecture of an example email processing apparatus are provided with reference to FIGS. 5-8.

Email Processing

In FIGS. 1-4, a method, apparatus, and non-transitory computer readable medium for dynamic internet protocol (IP) selection are described. One or more embodiments of the method, apparatus, and non-transitory computer readable medium include identifying, by an email processing apparatus, a plurality of email recipients, wherein each of the plurality of email recipients has an email address associated with one of a plurality of internet service providers (ISPs); identifying, by the email processing apparatus, a plurality of IP addresses, wherein each of the plurality of IP addresses is available for sending email from a user to the plurality of email recipients; computing, by a scoring component of the email processing apparatus, an ISP-IP score for each of a plurality of ISP-IP pairs based on email delivery statistics, wherein each of the plurality of ISP-IP pairs comprises an ISP from the plurality of ISPs and an IP address from the plurality of IP addresses; selecting, by a selection component of the email processing apparatus, an IP address from the plurality of IP addresses corresponding to each of the plurality of email recipients based on the ISP-IP score; and transmitting, by the email processing apparatus, an email to each of the plurality of email recipients from the selected IP address.

Some examples of the method, apparatus, and non-transitory computer readable medium further include identifying a binding group of the plurality of email recipients, wherein the plurality of IP addresses is identified based on the binding group.

Some examples of the method, apparatus, and non-transitory computer readable medium further include selecting a mail transfer agent (MTA) based on the ISP-IP score, wherein the email is transmitted using the MTA.

Some examples of the method, apparatus, and non-transitory computer readable medium further include identifying a reputation score for each of the plurality of IP addresses associated with the ISP, wherein the ISP-IP score is computed based on the reputation score.

Some examples of the method, apparatus, and non-transitory computer readable medium further include receiving historical data regarding recipient interaction associated with the IP address and the ISP, wherein the ISP-IP score is computed based on the historical data.

Some examples of the method, apparatus, and non-transitory computer readable medium further include providing the historical data as input to a machine learning model, wherein the ISP-IP score is computed based on an output of the machine learning model.

Some examples of the method, apparatus, and non-transitory computer readable medium further include receiving interaction data for the email. Some examples further include updating the machine learning model based on the interaction data. In some examples, the historical data comprises delivery data, bounce data, delay data, or any combination thereof.

Some examples of the method, apparatus, and non-transitory computer readable medium further include identifying a first number of emails sent from the IP address to the ISP. Some examples further include identifying a second number of emails delivered successfully to the ISP from the IP address. Some examples further include computing a ratio between the second number and the first number, wherein the ISP-IP score is based on the ratio.

Some examples of the method, apparatus, and non-transitory computer readable medium further include computing a relative ISP-IP score for the IP address based on ISP-IP scores for each of the plurality of IP addresses associated with the ISP.

FIG. 1 shows an example of email processing according to aspects of the present disclosure. For example, the method may be performed by user 500 interacting with email processing apparatus 510 via user device 505 as described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 105, a user initiates an email campaign. In some cases, the operations of this step refer to, or may be performed by, user as described with reference to FIG. 5. In some examples, the user is a marketer of a company. The user operates an email processing system including an email send service. In some cases, the user initiates an email campaign by clicking on the send button in an email authoring user interface (UI).

At operation 110, the system identifies email addresses for the email campaign. In some cases, the operations of this step refer to, or may be performed by, email processing apparatus as described with reference to FIGS. 5 and 6. In some examples, the email addresses represent target persons or target groups of the email campaign. The email addresses were stored in a database of a company. Each of the email addresses is associated with an email recipient. An email address is associated with one of a set of internet service providers (ISPs). For example, an email address having a suffix "@gmail.com" shows the email address is associated with Gmail® ISP or Gmail® email hosting server.

At operation 115, the system selects an internet protocol (IP) address based on an internet service provider (ISP) of the email addresses and a relative score of the IP address. In some cases, the operations of this step refer to, or may be performed by, email processing apparatus as described with reference to FIGS. 5 and 6. In some examples, the system selects one or more suitable IPs for each ISP based on historical data regarding an ISP-IP pair. The system calculates a relative score for the IP address with respect to a set of IP addresses. In some cases, intelligent selection of IPs leads to increase in inbox delivery rates.

At operation 120, the system transmits an email to the email addresses using the selected IP address. In some cases, the operations of this step refer to, or may be performed by, email processing apparatus as described with reference to FIGS. 5 and 6. Because the system selects the most suitable IPs for each ISP, the system provides relatively high inbox delivery rates for transmitting emails for an email campaign.

Figure 2:
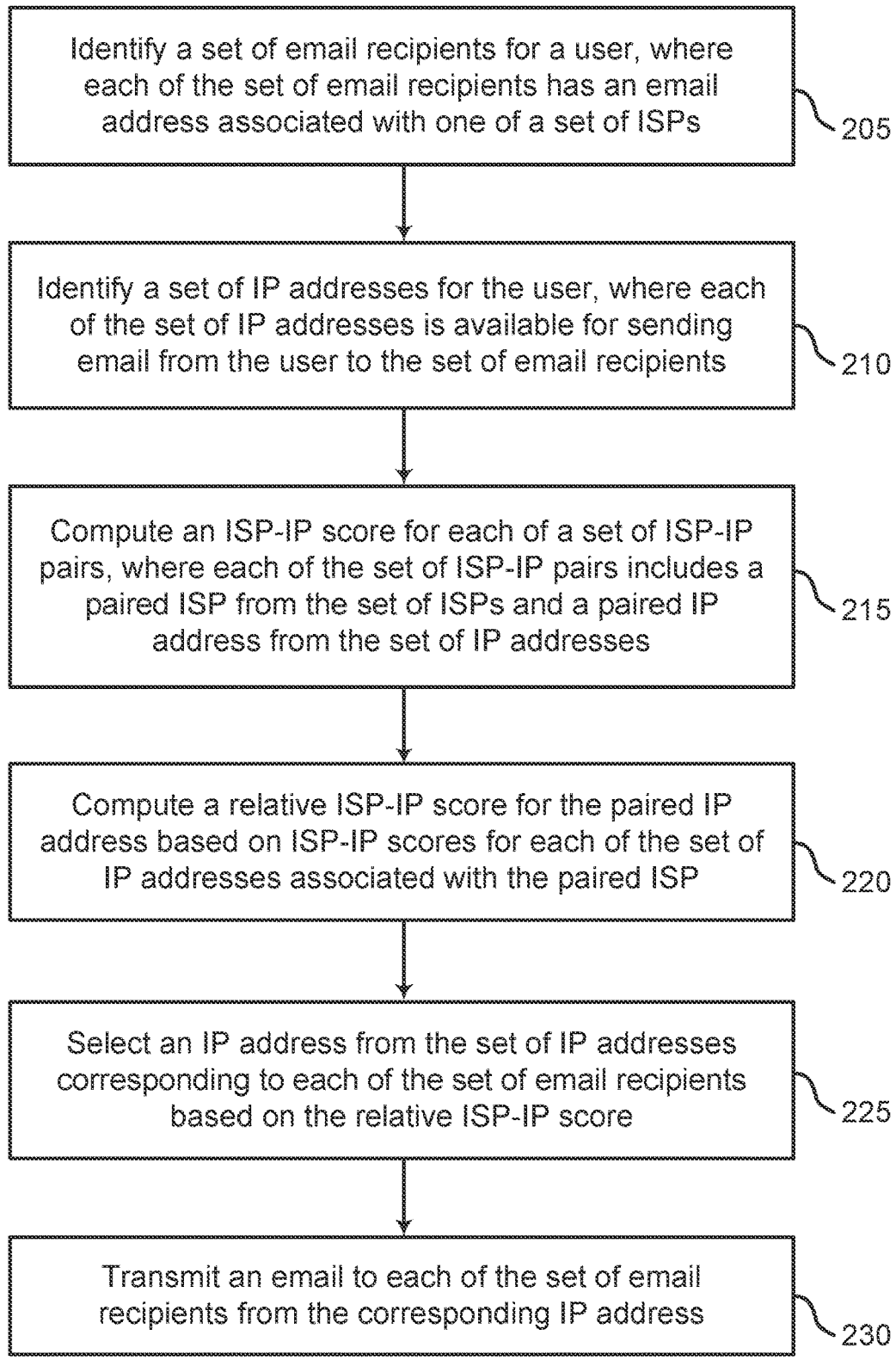
FIG. 2 shows an example of selecting an internet protocol (IP) address based on an ISP-IP score according to aspects of the present disclosure.

FIG. 2 shows an example of selecting an IP address based on an ISP-IP score according to aspects of the present disclosure. In some examples, these operations are performed by a system including a processor executing a set of codes to control functional elements of an apparatus (see FIG. 6, email processing apparatus 600). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Some embodiments of the present disclosure describe systems and methods to select the most suitable IP addresses for each ISP based on historical data. In some cases, scores for each ISP-IP pair are calculated based on the historical data. The email processing system selects the most suitable IPs for an ISP using a weighted sampling method.

At operation 205, the system identifies a set of email recipients for a user, where each of the set of email recipients has an email address associated with one of a set of ISPs. In some cases, the operations of this step refer to, or may be performed by, email processing apparatus as described with reference to FIGS. 5 and 6. In some examples, the email recipients are the target persons or target groups of an email campaign. The user is a marketer of a company or a user operating an email processing system for email campaigns. For example, an email address having suffix "@gmail.com" can be viewed as the particular email address is associated with Gmail® ISP (i.e., Gmail® email hosting service).

At operation 210, the system identifies a set of IP addresses for the user, where each of the set of IP addresses is available for sending emails from the user to the set of email recipients. In some cases, the operations of this step refer to, or may be performed by, email processing apparatus as described with reference to FIGS. 5 and 6. In some cases, the user is allocated multiple IP addresses. Each of the IP addresses has a different reputation score in relation to a different ISP. In some examples, a first IP address has a low reputation in relation to Gmail®; the first IP address has a high reputation in relation to Yahoo®. A low reputation of an IP address in relation to an ISP indicates that emails sent from the IP address are more likely to be categorized as spam emails by the ISP. A second IP address has a high reputation in relation to Gmail®; the second IP address has a low reputation in relation to Yahoo®. Accordingly, the system would send emails to email addresses associated with Yahoo® from the first IP address of the user. The system would send emails to email addresses associated with Gmail® from the second IP address of the user.

At operation 215, the system computes an ISP-IP score for each of a set of ISP-IP pairs based on email delivery statistics, where each of the set of ISP-IP pairs includes a paired ISP from the set of ISPs and a paired IP address from the set of IP addresses. In some cases, the operations of this step refer to, or may be performed by, scoring component as described with reference to FIGS. 6-8.

In some examples, an "ISP-IP score" measures email delivery success from an IP address to an ISP. The ISP-IP score may also be referred to as ISP specific IP score and can be measured as a ratio between total emails delivered successfully by an ISP and total emails sent to the ISP. In some examples, the scoring component of the email processing apparatus identifies a first number of emails sent from the paired IP address to the paired ISP; identifies a second number of emails delivered successfully to the paired ISP from the paired IP address; and computes a ratio between the second number and the first number. The ISP-IP score is based on the ratio. Detail with regard to calculating ISP-IP scores and relative ISP-IP scores will be described in FIG. 4.

According to an embodiment, there are a number of ISPs and IP addresses available. A user is allocated a set of IP addresses for email delivery. Email recipients are located at different ISPs (e.g., Gmail®, Yahoo®). Each combination of an ISP and an IP address is considered an ISP-IP pair. That is, an ISP-IP pair includes an IP address and an ISP.

At operation 220, the system computes a relative ISP-IP score for the paired IP address based on ISP-IP scores for each of the set of IP addresses associated with the paired ISP. In some cases, the operations of this step refer to, or may be performed by, scoring component as described with reference to FIGS. 6-8. The relative ISP-IP score for an IP address is calculated with respect to the set of IP addresses. In some cases, the relative ISP-IP score may also be referred to as relative IP score. Detail regarding computing a relative ISP-IP score will be described in greater detail in FIGS. 3 and 4.

At operation 225, the system selects an IP address from the set of IP addresses corresponding to each of the set of email recipients based on the relative ISP-IP score. In some cases, the operations of this step refer to, or may be performed by, selection component as described with reference to FIGS. 6-8. In some examples, the system selects suitable IP addresses for different ISPs using a weighted sampling method. Detail regarding selecting an IP address from the set of IP addresses is described with reference to FIG. 3.

At operation 230, the system transmits an email to each of the set of email recipients from the selected IP address. In some cases, the operations of this step refer to, or may be performed by, email processing apparatus as described with reference to FIGS. 5 and 6. Detail regarding transmitting an email to each of the set of email recipients from the corresponding IP address is described with reference to FIG. 5.

Figure 3:
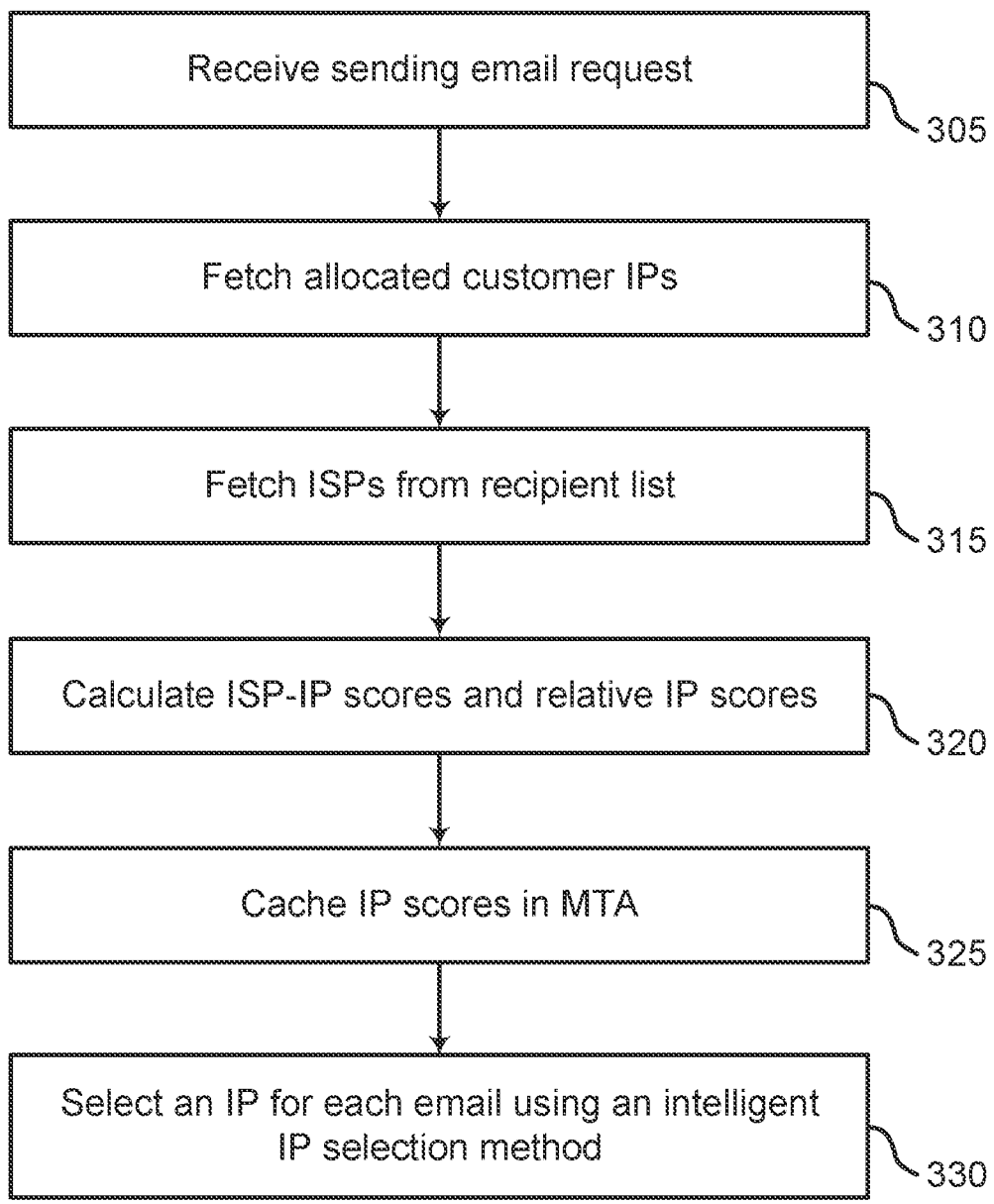
FIG. 3 shows an example of intelligent IP selection according to aspects of the present disclosure.

FIG. 3 shows an example of intelligent IP selection according to aspects of the present disclosure. The intelligent IP selection and a workflow for sending emails to an internet service provider (ISP) may be performed by email processing apparatus 510 as described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system receives sending email request. In some cases, the operations of this step refer to, or may be performed by, email processing apparatus as described with reference to FIGS. 5 and 6. In some examples, an email send request is triggered after a user clicks on the send button in the email authoring user interface (UI).

At operation 310, the system fetches allocated customer IPs. In some cases, the operations of this step refer to, or may be performed by, email processing apparatus as described with reference to FIGS. 5 and 6. After triggering the email send request, the system obtains a list of allocated customer IPs for the user (e.g., a marketer).

At operation 315, the system fetches ISPs from recipient list. In some cases, the operations of this step refer to, or may be performed by, email processing apparatus as described with reference to FIGS. 5 and 6. In some examples, the system obtains a list of internet service providers (ISPs) for delivery from the recipient list of the email campaign.

At operation 320, the system calculates ISP-IP scores and relative IP scores. In some cases, the operations of this step refer to, or may be performed by, scoring component as described with reference to FIGS. 6-8. In some cases, ISP specific intelligent IP selection is used to select suitable IPs. For example, a scoring component of the system calculates the scores for each IP specific to ISPs based on historical feedbacks (e.g., delivery, bounce, delay, etc.). In some examples, the historical data is provided by message transfer agents such as "Spark post Momentum". In some cases, the scoring component may also be referred to as an IP score service component. Detail with regard to calculating ISP-IP scores and relative IP scores will be described in FIG. 4.

At operation 325, the system caches relative IP scores in mail transfer agent (MTA). In some cases, the operations of this step refer to, or may be performed by, email processing apparatus as described with reference to FIGS. 5 and 6. After calculating the IP score, the system caches the relative IP scores in a mail transferring agent (MTA). For example, relative IP scores given an ISP are calculated with respect to a set of IP addresses by the scoring component. The relative IP scores are cached in MTAs.

At operation 330, the system selects an IP address for each email using an intelligent IP selection method. In some cases, the operations of this step refer to, or may be performed by, selection component as described with reference to FIGS. 6-8. In some examples, IP selection for each email is performed using weighted sampling algorithm. For example, email delivery to email addresses of an ISP (e.g., Hotmail) with two allocated IPs illustrates the weighted sampling selection algorithm. The weighted sampling selection algorithm is different from conventional scheduling algorithms (e.g., round robin algorithm). Table 1 below shows weighted sampling selection of IPs.

TABLE 1

Weighted sampling selection of IPs

| IPs | ISP Specific IP Score (%) $s_i$ | Relative IP Score (%) $r_i = \frac{s_i}{\Sigma \forall_i s_i} \times 100$ | Email Sent using IP ($m_i$) | Expected/Effective Email Delivery (%) $d_i = s_i \times m_i$ |
|---|---|---|---|---|
| 10.23.56.135 | 100 | $\frac{100}{100 + 40} \times 100 = 71.42$ | 71.42% | 100% × 71.42% = 71.42 |
| 10.23.56.136 | 40 | $\frac{40}{100 + 40} \times 100 = 28.58$ | 28.58% | 40% × 28.58% = 11.43 |

Based on Table 1, the overall expected delivery=71.42+11.43=82.85. Table 2 shows round robin/random selection of IPs.

TABLE 2

Round robin/random selection of IPs

| IPs | ISP Specific IP Score (%) $s_i$ | Relative IP Score (%) $r_i = \frac{s_i}{\Sigma \forall_i s_i} \times 100$ | Email Sent using IP ($m_i$) | Expected/Effective Email Delivery (%) $d_i = s_i \times m_i$ |
|---|---|---|---|---|
| 10.23.56.135 | 100 | $\frac{100}{100 + 40} \times 100 = 71.42$ | 50.00% | 100% × 50.00% = 50.00 |

TABLE 2-continued

Round robin/random selection of IPs

| IPs | ISP Specific IP Score (%) $s_i$ | Relative IP Score (%) $r_i = \frac{s_i}{\Sigma_{\forall i} s_i} \times 100$ | Email Sent using IP ($m_i$) | Expected/Effective Email Delivery (%) $d_i = s_i \times m_i$ |
|---|---|---|---|---|
| 10.23.56.136 | 40 | $\frac{40}{100 + 40} \times 100 = 28.58$ | 50.00% | 40% × 50.00% = 20.00 |

Based on Table 2, the overall expected delivery=50.00+20.00=70.00. The ISP-IP score weighted sampling algorithm increases email delivery efficiency compared to conventional methods. For example, the weighted sampling algorithm outperforms existing algorithm by 12.85% (i.e., 82.85−70.00=12.85). Emails are sent to different ISPs using the selected IPs. The weighted sampling selection algorithm of the present disclosure provides relatively high inbox delivery rates because the email processing apparatus (FIG. 6) selects the most suitable IPs for each ISP.

Figure 4:
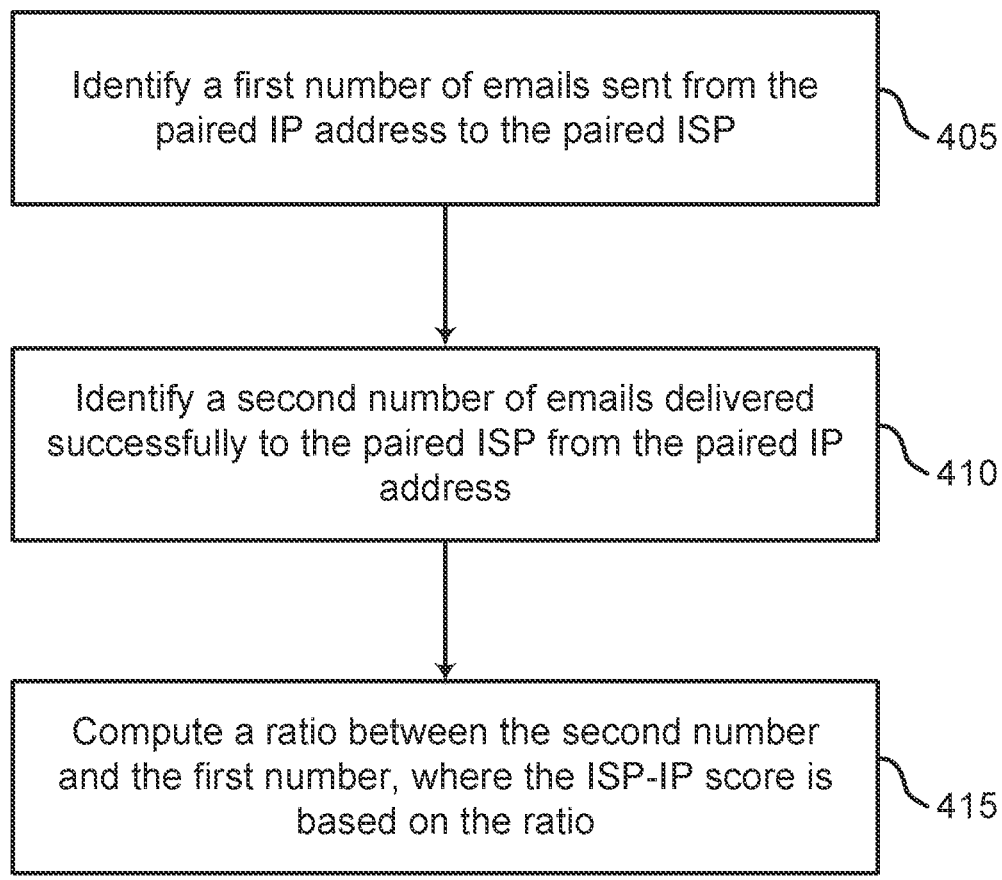
FIG. 4 shows an example of computing an ISP-IP score and a relative ISP-IP score with respect to a set of IP addresses according to aspects of the present disclosure.

FIG. 4 shows an example of computing an ISP-IP score and a relative ISP-IP score with respect to a set of IP addresses according to aspects of the present disclosure. The operations described in FIG. 4 is a further illustration of operation 215 and operation 220 as described with reference to FIG. 2. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system identifies a first number of emails sent from the paired IP address to the paired ISP. In some cases, the operations of this step refer to, or may be performed by, scoring component as described with reference to FIGS. 6-8. Scoring component calculates the scores for each IP specific to ISPs based on historical feedbacks (e.g., delivery, bounce, delay, etc.). In some examples, the historical data is provided by message transfer agents such as "Spark post Momentum".

At operation 410, the system identifies a second number of emails delivered successfully to the paired ISP from the paired IP address. In some cases, the operations of this step refer to, or may be performed by, scoring component as described with reference to FIGS. 6-8.

At operation 415, the system computes a ratio between the second number and the first number, where the ISP-IP score is based on the ratio. In some cases, the operations of this step refer to, or may be performed by, scoring component as described with reference to FIGS. 6-8. The ISP-IP scores are calculated based on the historical data. In some examples, the ISP specific scores are calculated as follows:

$$ISP \text{ specific } IP \text{ Scores}(s) = \frac{\text{Total Emails Delivered by } ISP}{\text{Total Emails Sent to } ISP} \times 100 \quad (1)$$

In some embodiments, the ISP specific score can be calculated using other algorithms or machine learning models over historical data.

According to an embodiment, the scoring component computes a relative ISP-IP score for the paired IP address based on ISP-IP scores for each of a set of IP addresses associated with the paired ISP. That is, the relative ISP-IP score is calculated with respect to the set of IP addresses given the ISP. In some cases, the relative ISP-IP score may also be referred to as relative IP score. The relative IP score for $i^{th}$ IP with ISP specific IP score $s_i$ is calculated as follows:

$$\text{Relative } IP \text{ Score } (r_i) = \frac{s_i}{\Sigma_{\forall i} s_i} \times 100 \quad (2)$$

After calculating the relative IP score, the email processing apparatus 600 (FIG. 6) caches the relative IP scores in a mail transferring agent (MTA). For example, relative IP scores for each ISP are obtained from the scoring component and cached in MTAs. Next, the IP selection for each email is performed using weighted sampling algorithm. Detail regarding the weighted sampling algorithm is described in FIG. 3.

Network Architecture

In FIGS. 5 to 8, an apparatus and method for dynamic IP selection are described. One or more embodiments of the apparatus and method include a data collection component configured to collect email delivery statistics for a plurality of internet service providers (ISPs) and a plurality of internet protocol (IP) addresses, wherein the email delivery statistics include a first number of emails sent from each of the plurality of IP addresses to each of the plurality of ISPs and a second number of emails delivered successfully from each of the plurality of IP addresses to each of the plurality of ISPs; a scoring component configured to compute an ISP-IP score for each of a plurality of ISP-IP pairs by calculating a ratio between the second number and the first number, wherein each of the plurality of ISP-IP pairs comprises an ISP from the plurality of ISPs and an IP address from the plurality of IP addresses; and a selection component configured to select an IP address from the plurality of IP addresses corresponding to each of a plurality of email recipients based on the ISP-IP score.

In some examples, the data collection component is configured to identify a binding group of the plurality of email recipients, wherein the plurality of IP addresses is identified based on the binding group.

In some examples, the selection component is configured to select a mail transfer agent (MTA) based on the ISP-IP score, wherein the email is transmitted using the MTA.

In some examples, the scoring component is configured to identify a reputation score for each of the plurality of IP addresses associated with the ISP, wherein the ISP-IP score is computed based on the reputation score.

In some examples, the scoring component is configured to compute a relative ISP-IP score for the IP address based on ISP-IP scores for each of the plurality of IP addresses associated with the ISP.

Figure 5:
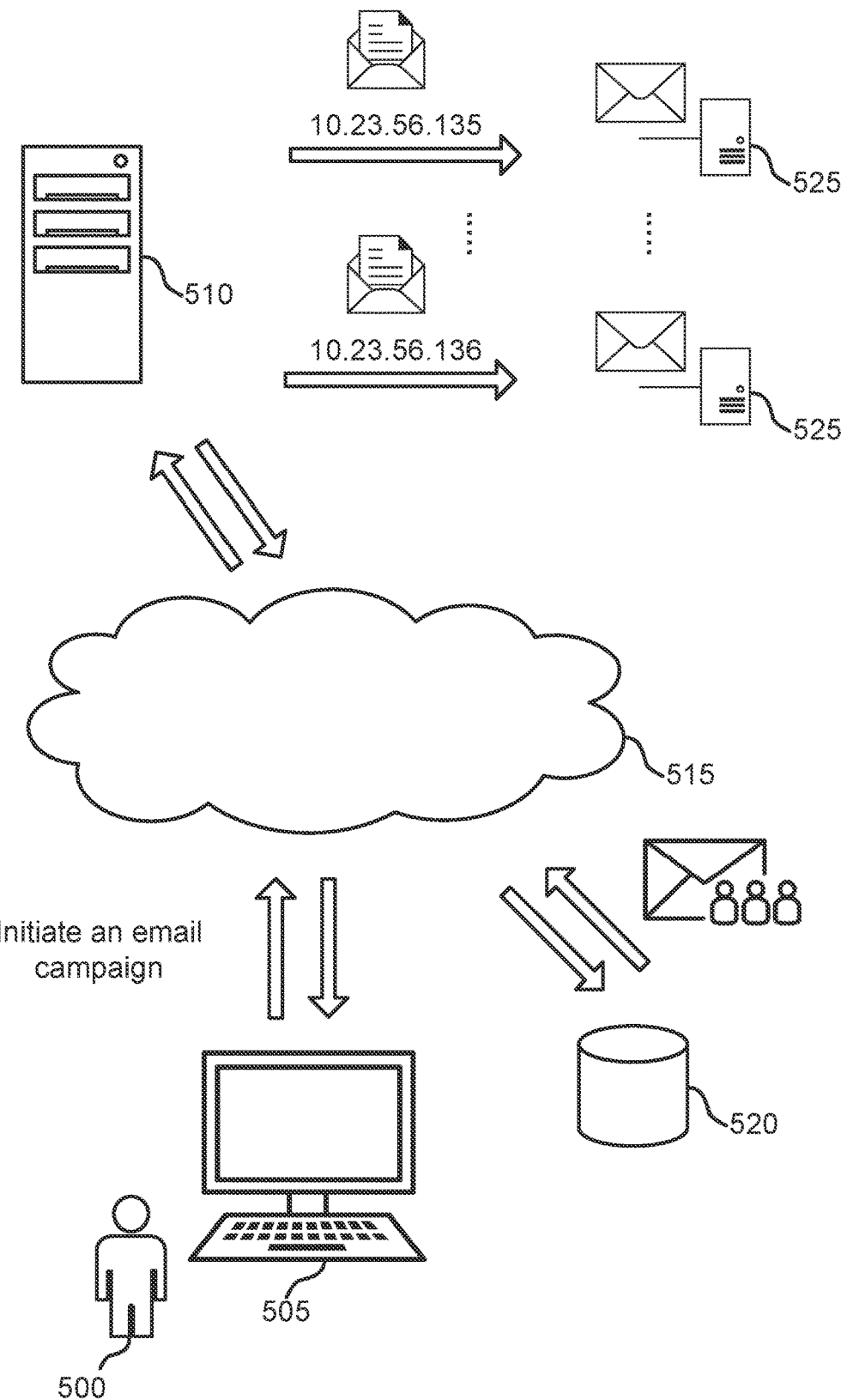
FIG. 5 shows an example of an email processing system according to aspects of the present disclosure.

FIG. 5 shows an example of an email processing system according to aspects of the present disclosure. The example shown includes user 500, user device 505, email processing apparatus 510, cloud 515, database 520, and email hosting server 525. Email processing apparatus 510 is an example of, or includes aspects of, the corresponding element described with reference to FIG. 6.

In an example of FIG. 5, user 500 initiates an email campaign. User 500 is a marketer of a company. By initiating the email campaign, user 500 triggers an email send request (e.g., by clicking the send button in an email authorizing user interface). The email send request is then sent to email processing apparatus 510, e.g., via user device 505 and cloud 515. Email processing apparatus 510 identifies a set of email recipients for user 500. In some examples, the set of email recipients are the target persons or target groups of the email campaign. Each email recipient has an email address associated with an internet service provider (ISP). An email address having suffix "@gmail.com" may be associated with an ISP (i.e., Gmail® or Google® email hosting server 525).

Email processing apparatus 510 fetches a list of IP addresses allocated to user 500. Additionally, email processing apparatus 510 obtains a list of ISPs (e.g., multiple email hosting servers 525) for delivery based on the recipients list of the email campaign. Email processing apparatus 510 computes an ISP-IP score for each of a set of ISP-IP pairs. Each of the set of ISP-IP pairs comprises a paired ISP from the set of ISPs and a paired IP address from the set of IP addresses. That is, email processing apparatus 510 calculates a score for each IP address allocated to user 500 specific to the list of ISPs based on historical feedback such as delivery, bounce, delay, etc.

Email processing apparatus 510 selects an IP address from the set of IP addresses corresponding to each of the set of email recipients based on the ISP-IP score. Email processing apparatus 510 transmits an email to each of the set of email recipients from the corresponding IP address.

User device 505 may be a personal computer, laptop computer, mainframe computer, palmtop computer, personal assistant, mobile device, or any other suitable processing apparatus. In some examples, user device 505 includes software that incorporates an email processing application. In some examples, the email processing application on user device 505 may include functions of email processing apparatus 510.

A user interface may enable user 500 to interact with user device 505. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Email processing apparatus 510 identifies a set of email recipients for a user, where each of the set of email recipients has an email address associated with one of a set of ISPs. Email processing apparatus 510 identifies a set of IP addresses for the user, where each of the set of IP addresses is available for sending email from the user to the set of email recipients. Email processing apparatus 510 computes an ISP-IP score for each of a set of ISP-IP pairs, where each of the set of ISP-IP pairs comprises a paired ISP from the set of ISPs and a paired IP address from the set of IP addresses. Email processing apparatus 510 selects an IP address from the set of IP addresses corresponding to each of the set of email recipients based on the ISP-IP score. Email processing apparatus 510 transmits an email to each of the set of email recipients from the corresponding IP address. The process of using email processing apparatus 510 is further described with reference to FIG. 1.

Email processing apparatus 510 includes a computer implemented network comprising a scoring component, a selection component, and a data collection component. In some examples, email processing apparatus 510 may also include a processor unit, a memory unit, and an I/O module. Additionally, email processing apparatus 510 can communicate with database 520 via cloud 515. In some cases, the architecture of the email processing apparatus is also referred to as an email processing system or an email data analytics apparatus. Further detail regarding the architecture of email processing apparatus 510 is provided with reference to FIGS. 5-8. Further detail regarding the operation of email processing apparatus 510 is provided with reference to FIGS. 1-4.

In some cases, email processing apparatus 510 is implemented on a server. A server provides one or more functions to users linked by way of one or more of the various networks. In some cases, the server includes a single microprocessor board, which includes a microprocessor responsible for controlling all aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 515 is a computer network configured to provide on-demand availability of computer system resources, such as data storage and computing power. In some examples, cloud 515 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 515 is limited to a single organization. In other examples, cloud 515 is available to many organizations. In one example, cloud 515 includes a multi-layer communications network comprising multiple edge routers and core routers. In another example, cloud 515 is based on a local collection of switches in a single physical location.

A database 520 is an organized collection of data such as email addresses of recipients. In some examples, these email addresses are stored in database 520 of a company. Recipient email addresses represent target persons or groups of an email campaign. For example, database 520 stores data in a specified format known as a schema. Database 520 may be structured as a single database, a distributed database, multiple distributed databases, or an emergency backup database. In some cases, a database controller may manage data storage and processing in database 520. In some cases, a user interacts with database controller. In other cases, database controller may operate automatically without user interaction.

According to some embodiments, email processing apparatus 510 identifies a set of email recipients for user 500, where each of the set of email recipients has an email address associated with an ISP of a set of ISPs. In some examples, email processing apparatus 510 identifies a set of IP addresses for user 500, where each of the set of IP addresses is available for sending email from user 500 to the set of email recipients. In some examples, email processing apparatus 510 transmits an email to each of the set of email recipients from the corresponding IP address. In some examples, email processing apparatus 510 identifies a binding group of the set of email recipients, where the set of IP addresses is identified based on the binding group.

Figure 6:
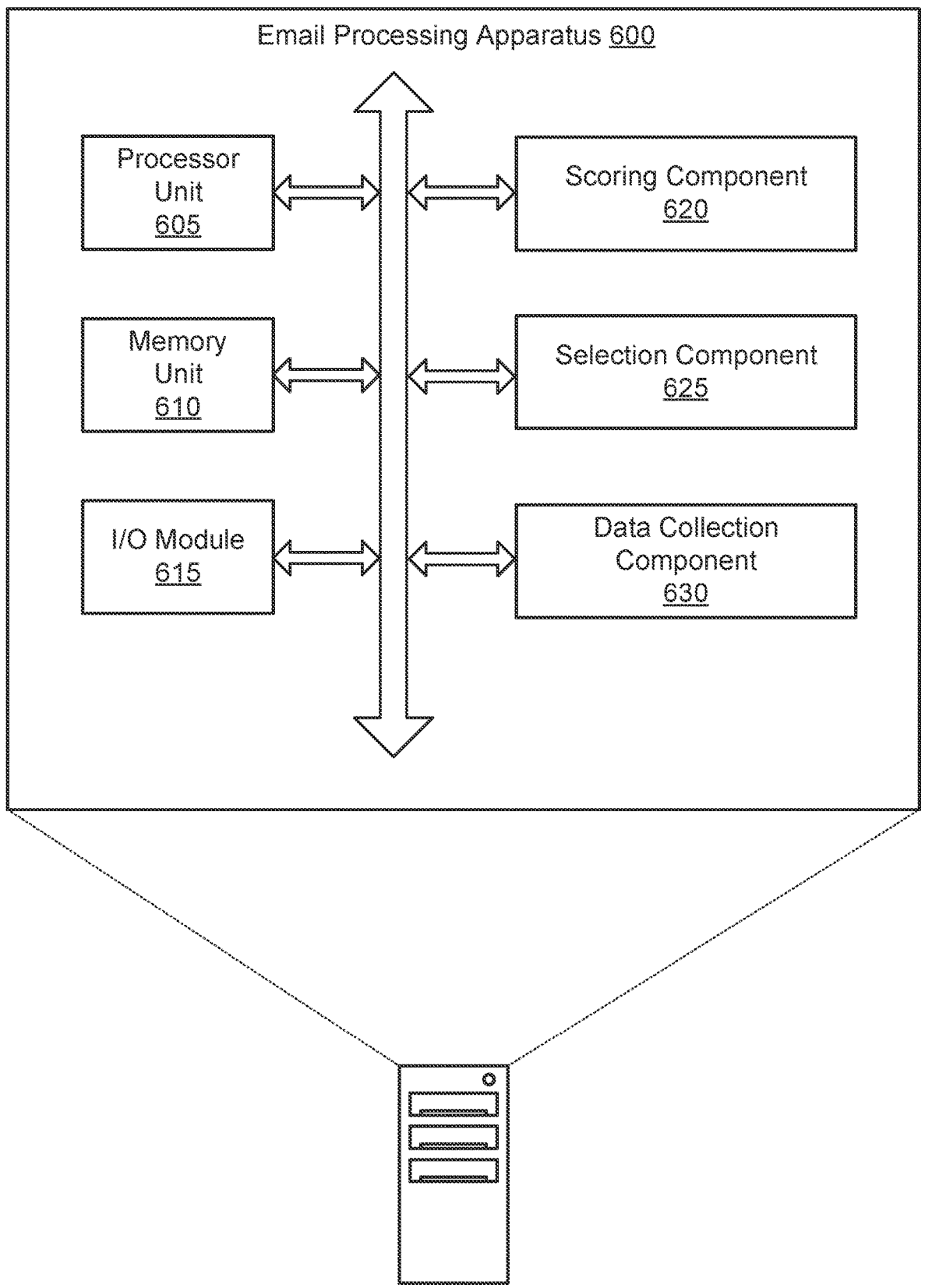
FIG. 6 shows an example of an email processing apparatus according to aspects of the present disclosure.

FIG. 6 shows an example of an email processing apparatus 600 according to aspects of the present disclosure. The example shown includes email processing apparatus 600, processor unit 605, memory unit 610, I/O module 615, scoring component 620, selection component 625, and data collection component 630. Email processing apparatus 600 is an example of, or includes aspects of, the corresponding element described with reference to FIG. 5.

Processor unit 605 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into processor unit 605. In some cases, processor unit 605 is configured to execute computer-readable instructions stored in a memory to perform various functions. In some embodiments, processor unit 605 includes special purpose components for modem processing, baseband processing, digital signal processing, or transmission processing.

Examples of memory unit 610 include random access memory (RAM), read-only memory (ROM), or a hard disk. Some examples of memory unit 610 include solid state memory and a hard disk drive. In some examples, memory unit 610 is used to store computer-readable, computer-executable software including instructions that, when executed, cause a processor to perform various functions described herein. In some cases, memory unit 610 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 610 store information in the form of a logical state.

I/O module 615 (e.g., an input/output interface) may include an I/O controller. An I/O controller may manage input and output signals for a device. The I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 615 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and a communication channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, email processing apparatus 600 includes a computer implemented artificial neural network (ANN) trained on interaction data. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, scoring component 620 computes an ISP-IP score for each of a set of ISP-IP pairs, where each of the set of ISP-IP pairs includes a paired ISP from the set of ISPs and a paired IP address from the set of IP addresses. In some examples, scoring component 620 identifies a reputation score for each of the set of IP addresses associated with the paired ISP, where the ISP-IP score is computed based on the reputation score. In some examples, scoring component 620 updates the machine learning model based on the interaction data. In some examples, scoring component 620 identifies a first number of emails sent from the paired IP address to the paired ISP. Scoring component 620 identifies a second number of emails delivered successfully to the paired ISP from the paired IP address. Then, scoring component 620 computes a ratio between the second number and the first number, where the ISP-IP score is based on the ratio. In some examples, scoring component 620 computes a relative ISP-IP score for the paired IP address based on ISP-IP scores for each of the set of IP addresses associated with the paired ISP. Scoring component 620 is an example of, or includes aspects of, the corresponding element described with reference to FIGS. 7 and 8.

According to some embodiments, selection component 625 selects an IP address from the set of IP addresses corresponding to each of the set of email recipients based on the ISP-IP score. In some examples, selection component 625 selects an MTA based on the ISP-IP score, where the email is transmitted using the MTA. Selection component 625 is an example of, or includes aspects of, the corresponding element described with reference to FIGS. 7 and 8.

According to some embodiments, data collection component 630 receives historical data regarding recipient interaction associated with the paired IP address and the paired ISP, where the ISP-IP score is computed based on the historical data. In some examples, data collection component 630 provides the historical data as input to a machine learning model, where the ISP-IP score is computed based on an output of the machine learning model. In some examples, data collection component 630 receives interaction data for the email. In some examples, the historical data includes delivery data, bounce data, delay data, or any combination thereof.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a web site, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 7:
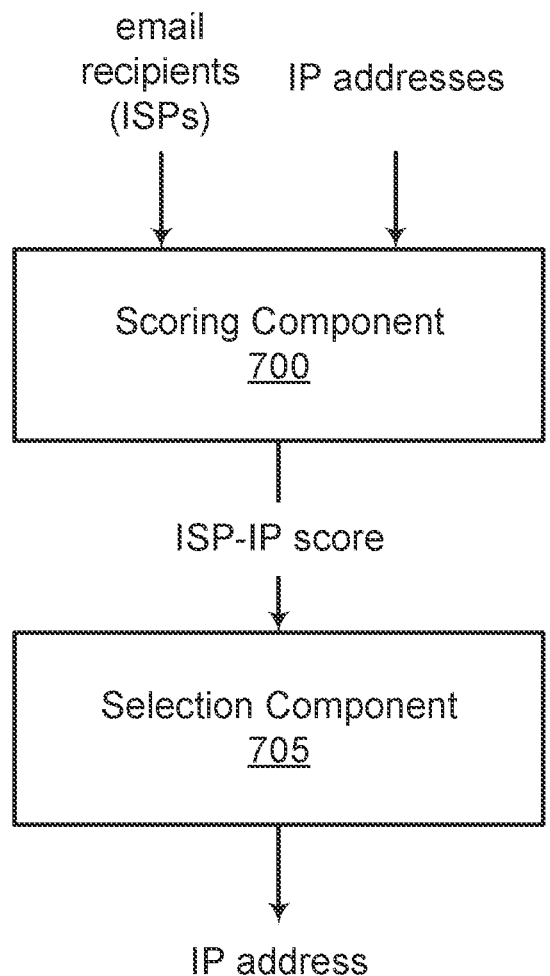
FIG. 7 shows an example of an email processing diagram according to aspects of the present disclosure.

FIG. 7 shows an example of an email processing diagram according to aspects of the present disclosure. The email processing diagram includes components of email processing apparatus 600 as described with reference to FIG. 6. The example shown includes scoring component 700 and selection component 705. As an example illustrated in FIG. 7, from top to bottom, a set of email recipients for a user (e.g., a marketer of a company) are input to scoring component 700. Each of the set of email recipients has an email address associated with one of a set of ISPs. For example, an email address with a suffix "@gmail.com" is associated with a Google® ISP or Gmail® email hosting server.

Additionally, a set of IP addresses are allocated for the user. Each of the set of IP addresses is available for sending emails from the user to the plurality of email recipients. In some examples, a company may be reserved four IP addresses for an email campaign. The set of IP addresses are also input to scoring component 700. Scoring component 700 computes an ISP-IP score for each of a set of ISP-IP pairs, wherein each of the set of ISP-IP pairs comprises a paired ISP from the set of ISPs and a paired IP address from the set of IP addresses. Detail regarding calculating the ISP-IP score for each of a set of ISP-IP pairs is described in FIG. 4. Scoring component 700 is an example of, or includes aspects of, the corresponding element described with reference to FIGS. 6 and 8.

Selection component 705 selects an IP address from the set of IP addresses corresponding to each of the set of email recipients based on the ISP-IP score. The selected IP address is a suitable IP address specific to an ISP. Email processing apparatus 600 transmits an email to each of the set of email recipients from the corresponding IP address. Selection component 705 is an example of, or includes aspects of, the corresponding element described with reference to FIGS. 6 and 8.

Figure 8:
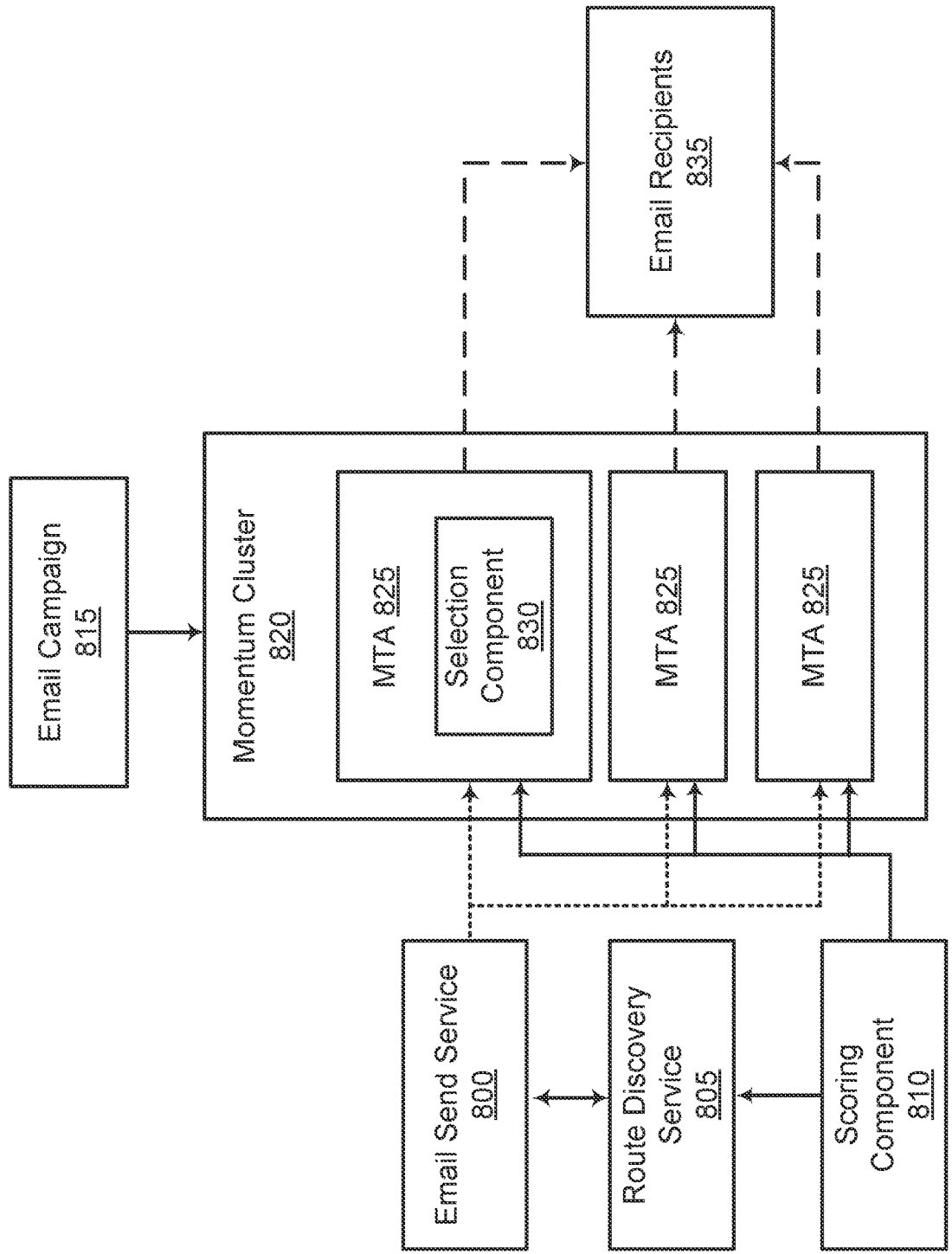
FIG. 8 shows an example of an email processing system including a dynamic IP selection component according to aspects of the present disclosure.

FIG. 8 shows an example of an email processing system including a dynamic IP selection component according to aspects of the present disclosure. The email processing system includes several components of email processing apparatus 600 as described with reference to FIG. 6. The example shown includes email send service 800, route discovery service 805, scoring component 810, email campaign 815, momentum cluster 820, MTA 825, selection component 830, and email recipients 835.

In some examples, legends can be implemented by choosing the most suitable IP for every email recipient 835. In some cases, IP selection methods described in the present specification may be used to select the most suitable MTA for a delivery based on cumulative score of IPs attached on every MTA.

According to an embodiment, email send service 800 is a multi-tenant service that facilitates sending emails at scale after message preparation phase. Email send service 800 triggers or initiates the email campaign.

According to an embodiment, email route discovery service 805 is an ancillary service of email send service 800. Route discovery service 805 is configured to update the IP binding information which enables email processing apparatus 600 (FIG. 6) to route traffic to the appropriate MTA node.

According to an embodiment, scoring component 810 is configured to calculate and store the IP score specific to ISPs (i.e., ISP-IP scores) and relative ISP-IP scores. In some cases, MTA 825 includes a dynamic IP selection module (i.e., selection component 830) used for selecting the most suitable IP for email delivery. For example, momentum cluster 820 includes multiple MTA nodes for sending emails. In some cases, scoring component 810 may also be referred to as IP score service component. Scoring component 810 is an example of, or includes aspects of, the corresponding element described with reference to FIGS. 6 and 7. Selection component 830 is an example of, or includes aspects of, the corresponding element described with reference to FIGS. 6 and 7.

According to an embodiment, a user (e.g., a marketer) is allocated multiple IP addresses, and these IPs are attached to MTAs. For example, company XX may be allocated 4 IPs for email campaigns. Out of these four IPs, two IPs are attached on MTA1 and the remaining two IPs are attached on MTA2. When there is email send request, email send service 800 distributes the email send request among MTA1 and MTA2. Recall each email recipient has an email address associated with one of a set of ISPs (e.g., Gmail®, Yahoo®). Each of the IP addresses may have a different reputation metric in relation to each of the set of ISPs. Because each of the MTAs have two IPs for company XX, email processing apparatus 600 (see FIG. 6) chooses which IP address is suitable to deliver emails to email recipients 835 of company XX based on the ISP-IP score and the relative ISP-IP score with respect to a set of IP addresses given an ISP. Scoring component 810 calculates the ISP-IP score. In some examples, email send service 800 is configured to forward email send requests to appropriate MTAs.

Performance of apparatus, systems and methods of the present disclosure have been evaluated, and results indicate embodiments of the present disclosure have obtained increased performance over existing technology. Example experiments demonstrate that the email processing apparatus outperforms conventional systems.

In some example experiments, inbox placement rates using intelligent IP selection methods as described in the present specification are evaluated. During and after the experiments, results are recorded. For example, Apple® has an inbox placement rate of 75% using the IP selection method compared to a rate of 25% without selecting IPs. In some cases, an email processing system has an average 81.8% of inbox placement rate for service providers by selecting IPs for email delivery (i.e., compared to 78% without IP selection).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for email processing, comprising:
identifying, by an email processing apparatus, a plurality of email recipients, wherein each of the plurality of email recipients has an email address associated with one of a plurality of internet service providers (ISPs);
identifying, by the email processing apparatus, a plurality of internet protocol (IP) addresses available for sending email from a user to the plurality of email recipients;
for each candidate IP address of the plurality of IP addresses, computing, by a scoring component of the email processing apparatus, a plurality of ISP-IP scores for sending email from the candidate IP address, wherein each ISP-IP score of the plurality of ISP-IP scores corresponds to a likelihood of successfully delivering email from the candidate IP address to an ISP from the plurality of ISPs of the plurality of email recipients;
for each candidate IP address of the plurality of IP addresses, computing a relative IP score for a target ISP of the plurality of ISPs based on an ISP-IP score corresponding to the candidate IP address and the target ISP, wherein the relative IP score corresponds to a likelihood of successfully delivering email from the candidate IP address via the target ISP relative to other IP addresses of the plurality of IP addresses;
selecting, by a selection component of the email processing apparatus, an IP address from the plurality of IP addresses based on the relative IP score corresponding to the selected IP address; and
transmitting, by the email processing apparatus, an email message from the selected IP address via the target ISP.

2. The method of claim 1, further comprising:
identifying a binding group of the plurality of email recipients, wherein the plurality of IP addresses is identified based on the binding group.

3. The method of claim 1, further comprising:
selecting a mail transfer agent (MTA) based on the ISP-IP score, wherein the email message is transmitted using the MTA.

4. The method of claim 1, further comprising:
identifying a reputation score for each of the plurality of IP addresses associated with the ISP, wherein the plurality of ISP-IP scores are computed based on the reputation score.

5. The method of claim 1, further comprising:
receiving historical data regarding recipient interaction associated with the IP address and the ISP, wherein the ISP-IP score is computed based on the historical data.

6. The method of claim 5, further comprising:
providing the historical data as input to a machine learning model, wherein the plurality of ISP-IP scores are computed based on an output of the machine learning model.

7. The method of claim 6, further comprising:
receiving interaction data for the email; and
updating the machine learning model based on the interaction data.

8. The method of claim 5, wherein:
the historical data comprises delivery data, bounce data, delay data, or any combination thereof.

9. The method of claim 1, further comprising:
identifying a first number of emails sent from the IP address to the ISP;
identifying a second number of emails delivered successfully to the ISP from the IP address; and computing a ratio between the second number and the first number, wherein the ISP-IP score is based on the ratio.

10. An apparatus for email processing, comprising:
at least one processor; and
at least one memory including instructions executable by the at least one processor to:
collect email delivery statistics for a plurality of internet service providers (ISPs) and a plurality of internet protocol (IP) addresses available for sending email from a user to a plurality of email recipients, wherein each of the plurality of email recipients has an email address associated with one of the plurality of ISPs, and wherein the email delivery statistics include a first number of emails sent from an IP address of the plurality of IP addresses to each of the plurality of ISPs and a second number of emails delivered successfully from the IP address to each of the plurality of ISPs;
for each candidate IP address of the plurality of IP addresses, compute a plurality of ISP-IP scores for sending email from the candidate IP address by calculating a ratio between the second number and the first number, wherein each ISP-IP score of the plurality of ISP-IP scores corresponds to a likelihood of successfully delivering email from the candidate IP address to an ISP from the plurality of ISPs of the plurality of email recipients;
for each candidate IP address of the plurality of IP addresses, compute a relative IP score for a target ISP of the plurality of ISPs based on an ISP-IP score corresponding to the candidate IP address and the target ISP, wherein the relative IP score corresponds to a likelihood of successfully delivering email from the candidate IP address via the target ISP relative to other IP addresses of the plurality of IP addresses; and
select an IP address from the plurality of IP addresses based on the relative IP score corresponding to the selected IP address.

11. The apparatus of claim 10, further comprising instructions executable by the at least one processor to:
identify a binding group of the plurality of email recipients, wherein the plurality of IP addresses is identified based on the binding group.

12. The apparatus of claim 10, further comprising instructions executable by the at least one processor to:
select a mail transfer agent (MTA) based on the ISP-IP score, wherein an email message is transmitted using the MTA.

13. The apparatus of claim 10, further comprising instructions executable by the at least one processor to:
identify a reputation score for each of the plurality of IP addresses associated with the ISP, wherein the ISP-IP score is computed based on the reputation score.

14. A method for email processing, comprising:
collecting, by a data collection component of an email processing apparatus, email delivery statistics for a plurality of internet service providers (ISPs) and a plurality of internet protocol (IP) addresses available for sending email from a user to a plurality of email recipients, wherein each of the plurality of email recipients has an email address associated with one of the plurality of ISPs;
for each candidate IP address of the plurality of IP addresses, computing, by a scoring component of the email processing apparatus, a plurality of ISP-IP scores for sending email from the candidate IP address, wherein each ISP-IP score of the plurality of ISP-IP scores corresponds to a likelihood of successfully delivering email from the candidate IP address to an ISP from the plurality of ISPs of the plurality of email recipients;
for each candidate IP address of the plurality of IP addresses, computing a relative IP score for a target ISP of the plurality of ISPs based on an ISP-IP score corresponding to the candidate IP address and the target ISP, wherein the relative IP score corresponds to a likelihood of successfully delivering email from the candidate IP address via the target ISP relative to other IP addresses of the plurality of IP addresses;
selecting, by a selection component of the email processing apparatus, an IP address from the plurality of IP addresses based on the relative IP score corresponding to the selected IP address; and
transmitting, by the email processing apparatus, an email message from the selected IP address via the target ISP.

15. The method of claim 14, further comprising:
identifying a binding group of the plurality of email recipients, wherein the plurality of IP addresses is identified based on the binding group.

16. The method of claim 14, further comprising:
selecting a mail transfer agent (MTA) based on the ISP-IP score, wherein the email message is transmitted using the MTA.

17. The method of claim 14, further comprising:
identifying a reputation score for each of the plurality of IP addresses associated with the ISP, wherein the ISP-IP score is computed based on the reputation score.

18. The method of claim 14, further comprising:
identifying a first number of emails sent from the IP address to the ISP;
identifying a second number of emails delivered successfully to the ISP from the IP address; and
computing a ratio between the second number and the first number, wherein the ISP-IP score is based on the ratio.

* * * * *